United States Patent
Malani et al.

(10) Patent No.: US 11,403,202 B2
(45) Date of Patent: Aug. 2, 2022

(54) POWER MONITORING SYSTEM FOR VIRTUAL PLATFORM SIMULATION

(71) Applicant: Intel Corporation, Santa Clara, CA (US)

(72) Inventors: Parth Malani, Santa Clara, CA (US); Mangesh Tamhankar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 15/657,009

(22) Filed: Jul. 21, 2017

(65) Prior Publication Data

US 2017/0322860 A1 Nov. 9, 2017

Related U.S. Application Data (63) Continuation of application No. 14/208,934, filed on Mar. 13, 2014, now abandoned.

(51) Int. Cl.
  G06F 11/34 (2006.01)
  G06F 119/06 (2020.01)
  G06F 11/30 (2006.01)

(52) U.S. Cl.
  CPC ...... *G06F 11/3457* (2013.01); *G06F 11/3062* (2013.01); *G06F 11/3031* (2013.01);
  (Continued)

(58) Field of Classification Search
  CPC ............ G06F 11/3457; G06F 11/3062; G06F 2119/06; G06F 11/3031; G06F 11/3409;
  (Continued)

(56) References Cited

U.S. PATENT DOCUMENTS

| | | | | |
|---|---|---|---|---|
| 5,555,201 A | * | 9/1996 | Dangelo | G06F 30/33 716/102 |
| 6,321,366 B1 | * | 11/2001 | Tseng | G06F 30/331 326/94 |

(Continued)

FOREIGN PATENT DOCUMENTS

| | | |
|---|---|---|
| EP | 2033060 B1 | 4/2013 |
| WO | 2015084297 A1 | 6/2015 |

OTHER PUBLICATIONS

Kumar, S., et al. "An Efficient Power Estimation Methodology for Complex RISC Processor-based Platforms" GLSVLSI'12, pp. 239-244 (2012) available from <https://dl.acm.org/doi/abs/10.1145/2206781.2206839> (Year: 2012).*

(Continued)

*Primary Examiner* — Jay Hann
(74) *Attorney, Agent, or Firm* — Hanley, Flight & Zimmerman, LLC (57) ABSTRACT

This application is directed to a power monitoring system for virtual platform simulation. In one embodiment, a simulation system may comprise a virtual power monitor (VP-MON) and a performance simulator. An example VPMON module may include at least a system agent (SA) module to receive virtual platform data from the performance simulator. The SA module may then be further to determine at least one component power model based on the virtual platform data, and may proceed to formulate a platform power model based on the at least one component power model. During simulation of the virtual platform, the SA module may be further to generate power data corresponding to the virtual platform based on the platform power model. For example, the SA module may obtain performance data from the performance simulator, and may provide the performance data to the platform power model to generate the power data.

18 Claims, 5 Drawing Sheets

(52) U.S. Cl.
CPC ...... *G06F 11/3409* (2013.01); *G06F 2119/06* (2020.01); *G06F 2201/815* (2013.01); *Y02D 10/00* (2018.01)

(58) Field of Classification Search
CPC .... G06F 2201/815; Y02D 10/11; Y02D 10/34
See application file for complete search history.

(56) References Cited

U.S. PATENT DOCUMENTS

| | | | |
|---|---|---|---|
| 7,613,599 B2* | 11/2009 | Bade | G06F 30/33 703/16 |
| 7,702,499 B1 | 4/2010 | Lavagno et al. | |
| 8,072,992 B2 | 12/2011 | Deal et al. | |
| 8,453,086 B2 | 5/2013 | Tung et al. | |
| 8,898,049 B2 | 11/2014 | Dhanwada et al. | |
| 9,116,897 B2* | 8/2015 | Rowan | G06F 11/3062 |
| 9,176,841 B2 | 11/2015 | Kansal et al. | |
| 9,563,724 B2* | 2/2017 | Brock | G06F 30/367 |
| 2006/0277509 A1 | 12/2006 | Tung et al. | |
| 2008/0104552 A1 | 5/2008 | Kamada | |
| 2009/0171646 A1 | 7/2009 | Silbermintz et al. | |
| 2010/0268523 A1 | 10/2010 | Dhanwada et al. | |
| 2011/0035203 A1 | 2/2011 | Dalton et al. | |
| 2011/0107293 A1 | 5/2011 | Ganzhorn et al. | |
| 2011/0213997 A1 | 9/2011 | Kansal et al. | |
| 2013/0096901 A1 | 4/2013 | Gellerich et al. | |
| 2013/0174128 A1 | 7/2013 | Kansal et al. | |
| 2014/0107999 A1 | 4/2014 | Frenkil | |
| 2016/0203070 A1 | 7/2016 | Malani et al. | |
| 2016/0302070 A1 | 7/2016 | Malani et al. | |

OTHER PUBLICATIONS

Hung, S., et al. "Performance and Power Estimation for Mobile-Cloud Applications on Virtualized Platforms" 7th Int'l Conf. on Innovative Mobile & Internet Services in Ubiquitous Computing, pp. 260-267 (2013) (Year: 2013).*

Hao, S., et al. "Estimating Mobile Application Energy Consumption using Program Analysis" IEEE ICSE, pp. 92-101 (2013) (Year: 2013).*

Stralen, P. & Pimentel, A. "A High-level Microprocessor Power Modeling Technique Based on Event Signatures" J. Signal Process Syst., vol. 60, pp. 239-250 (2010) (Year: 2008).*

Examination Report issued in European Application No. 15761630.1, dated Jun. 25, 2018, 5 pages.

Extended European Search Report issued in European Application No. 15761630.1, dated Oct. 13, 2017, 7 pages.

Chinese Office Action issued in Chinese Patent Application No. 201580008563.8, dated Jan. 17, 2019, 14 pages.

International Search Report and Written Opinion received for PCT Application No. PCT/US2015/019229, dated May 26, 2015, 14 pages.

http://www.windriver.com/products/simics/, 8 pages.

http://www.intel.com/content/www/us/en/cofluent/intel-cofluent-studio.html, 10 pages.

http://www.windriver.com/products/simics/simics-supported-targets.html, 5 pages.

Malani, et al., "Software Power and Performance Correlation on Simics," Intel Technology Journal, vol. 17, Issue 2, 2013, pp. 112-123.

International Report on Patentability and Written Opinion issued in PCT Application No. PCT/US2015/019229, dated Sep. 22, 2016, 9 pages.

Office Action issued in U.S. Appl. No. 14/208,934, dated Sep. 23, 2016, 15 pages.

Office Action issued in U.S. Appl. No. 14/208,934, dated Feb. 2, 2107, 22 pages.

Office Action issued in U.S. Appl. No. 14/208,934, dated Jul. 3, 2017, 21 pages.

Dhanwada, N., et al.: "Transaction-level modeling for architectural and power analysis of PowerPC and CoreConnect-based systems", Design Automation Embedded Systems, Feb. 2006, vol. 10, pp. 105-125.

Teich, J.: "Hardware/Software Codesign: The Past, the Present, and Predicting the Future", Proceedings of IEEE, May 13, 2012, vol. 100, pp. 1411-1430, available from <http://ieeexplore.ieee.org/document/6172642/?arnumber=6172642>.

Schurmans, S., et al.: "ESL Power Estimation using Virtual Platforms with Black Box Processor Models", 3rd Workshop on Virtual Prototyping of Parallel and Embedded Systems, IEEE ViPES 2015, pp. 354-359.

Chinese Office Action issued in Chinese Patent Application No. 201580008563.8, dated Sep. 18, 2019, 10 pages.

Chinese Office Action issued in Chinese Application No. 201580008563.8, dated Apr. 19, 2018, with English translation, 17 pages.

Notice of Allowance issued in European Application No. 15761630.1, dated Apr. 17, 2019, 7 pages.

* cited by examiner

POWER MONITORING SYSTEM FOR VIRTUAL PLATFORM SIMULATION

CROSS-REFERENCE TO RELATED APPLICATIONS

The present application is a continuation of U.S. patent application Ser. No. 14/208,934, filed on Mar. 13, 2014, the entire disclosure of which is incorporated herein by reference.

TECHNICAL FIELD

The present disclosure relates to hardware simulation, and more particularly, to a system that may interact with a performance simulation to generate power data for a virtual platform.

BACKGROUND

Designers of electronic equipment may employ simulation systems to learn about their designs prior to hardware implementation. In this manner, substantial expense, resources, time, etc. may be saved on implementing problematic designs. Existing simulation systems focus on hardware performance to allow designers to get the most out of their designs. For example, a simulation of a device may allow designers to visualize how various components may interact, the speed of their interaction, potential outputs, etc. While the ability to simulate performance continues to be beneficial to designers, focus is increasing on various energy-related operational characteristics such as, for example, energy consumption on a per component basis and in total, energy efficiency, etc. Energy characteristics may be important to, for example, the growing segment of electronic equipment that may rely on battery power such as, for example, mobile communication devices like smart phones, mobile computing devices like tablet computers, etc.

Available design systems may comprise a limited power-related modeling feature set, but not what is required to support modern short design cycle times. Existing power-related features may include disjoint tools and analytical models that are not able to evaluate system simulations of real-world operational scenarios in a consistent manner. In particular, they cannot model the interaction between various components in a computing system such as, for example, a central processing unit (CPU), graphics processing unit (GPU), memory, interfaces, buses, etc. in view of typical operating system tasks, applications, etc. The resulting lack of consistency, ability, etc. greatly reduces the usefulness of the power characteristics that may be generated by the tool. Moreover, existing power-related diagnostics are typically extraneous features integrated within the entire feature set of a specific simulation system. This manner of incorporation shackles the abilities of the features to the limitations of the particular simulation system. An operator (e.g., a designer) is then forced to learn the particulars of a variety of different energy-related diagnostic tools instead of being able to employ a single tool in a variety of different simulation scenarios.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This application is directed to a power monitoring system for virtual platform simulation. In one embodiment, a simulation system may comprise a virtual power monitor (VPMON) and a performance simulator. The VPMON module may include, for example, at least a system agent (SA) module to receive virtual platform data from the performance simulator. The SA module may then be further to determine at least one component power model (e.g., that may be selected from a power model library in the VPMON module) based on the virtual platform data, and may proceed to formulate a platform power model based on the at least one component power model. During simulation of the virtual platform, the SA module may be further to generate power data corresponding to the virtual platform based on the platform power model. For example, the SA module may obtain (e.g., sample periodically) performance data from the performance simulator, and may provide the performance data to the platform power model to generate the power data.

In one embodiment, a simulation system may comprise a VPMON module to interact with a performance simulator. The VPMON module may comprise at least an SA module. The SA module may be to receive at least virtual platform data from the performance simulator, determine at least one component power model based on the virtual platform data, formulate a platform power model based on the at least one component power model and generate power data corresponding to the virtual platform based on the platform power model.

In one embodiment, the SA module being to determine at least one component power model may comprise the SA module being to select at least one component power model to correspond to at least one virtualized component in the virtual platform data. For example, the VPMON module may further comprise a power model library, the SA module being to select the at least one component power model from the power model library. An example power model library may comprise at least one of dynamic component power models and static component power models. In one example implementation, the VPMON module may further comprise a power data presentation module to facilitate presentation of the power data and a programmatic wrapper to encapsulate at least the SA module, power model library and power data presentation module. The VPMON module may be comprised of a software component extension that plugs into the performance simulator.

In the same or a different embodiment, the SA module being to formulate a platform power model may comprise the SA module being to facilitate inserting component power modules into, or removing component power modules from, the platform power model. The SA module being to generate power characteristics may comprise the SA module being to receive at least performance data from the performance simulator and utilize the platform power model to generate the power data based on the performance data. The SA module being to receive at least performance data may comprise the SA module being to sample the performance data periodically. An example method consistent with the present disclosure may comprise receiving at least virtual platform data in a virtual power monitor module from a performance simulator, determining at least one component power model based on the virtual platform data, formulating a platform power model based on the at least one component power model and generating power data corresponding to the virtual platform based on the platform power model.

Figure 1:
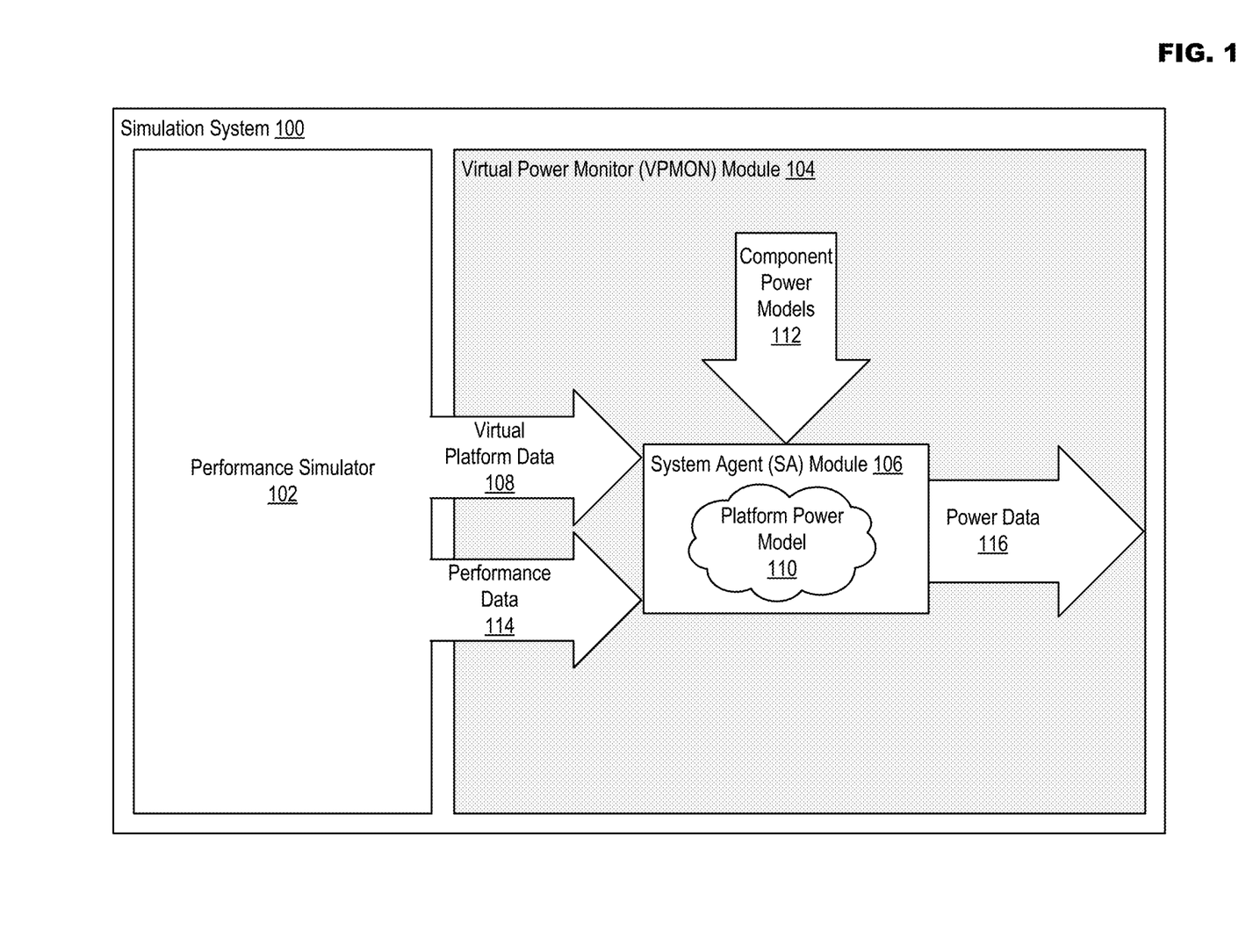
FIG. 1 illustrates an example power monitoring system for virtual platform simulation in accordance with at least one embodiment of the present disclosure.

FIG. 1 illustrates an example power monitoring system for virtual platform simulation in accordance with at least one embodiment of the present disclosure. A simulation system may be, in general, to generate a software-based model (e.g., virtual platform) of a hardware device. For example, the virtual platform may be put together at the component level, wherein hardware components making up the hardware device may be represented with software-based component models. The component models may then be arranged as they would in the real-world device to formulate the virtual platform. The virtual platform may be used to simulate the operation of the hardware device, wherein execution of the virtual platform given a real-world situation (e.g., in view of possible real-world tasks, inputs, environmental conditions, etc.) may be monitored to generate performance data that corresponds to predicted performance for the hardware device.

Existing architectural and Register Transfer Level (RTL) power simulation tools, such as an Architectural Level Power Simulator (ALPS), that may be accurate but are also confined in their scope and speed. The current approach for full-system power modeling involves several disjoint tools. Furthermore, these approaches do not encompass a realistic scenario of customer application execution. For example, a 40% run-to-run variation in simulated device performance (e.g., when running several multithreaded applications) is not uncommon when utilizing existing tools. This variation may be caused by, for example, thread contention and scheduling that may result in power variation. Some platform simulators may run multithreaded application binaries as-is through operating system (OS) involvement features, but do not include power monitoring functionality. On the other hand, current trace-based power simulation methods are not able to depict such scenarios. Other existing power modeling methods are offline and use application trace to model power. While these offline methods may report metrics such as performance-per-watt, the power that is monitored offline may not correspond to exact performance run.

In one embodiment, simulation system 100 may comprise at least performance simulator 102 and VPMON module 104. Performance simulator 102 may include, for example, software and/or equipment in simulation system 100 that may run a virtual platform to simulate hardware device performance. Examples of performance simulators 102 may comprise, but are not limited to, the Simics system simulator manufactured by Wind River Systems Incorporated, the CoFluent system simulator manufactured by Intel Corporation, etc. These packages may be employed to simulate the performance of hardware devices based on a virtual platform. While performance simulators 102, such as mentioned above, may be able to simulate device performance, they lack the ability to model power usage for hardware devices. However, performance simulators 102 may include modular and debug features that allow for third-party interaction. VPMON module 104 may take advantage of these features in performance simulator 102. For example, VPMON module 104 may be embodied as a software-based extension that may "plug into" performance simulator 102. In this configuration, VPMON module 104 may be able to interact with a variety of performance simulators 102, and may at least use data received from performance simulator 102 to, for example, formulate a platform power model, generate power data, etc.

In one embodiment, VPMON module 104 may comprise at least SA module 106. SA module 106 may be at least to formulate a platform power model based on a virtual platform in performance simulator 102, and to further utilize the platform power model to generate power data during the simulation of the virtual platform by performance simulator 102, the power data characterizing power-related performance of the virtual platform. In an example of operation, SA module 106 may initially receive virtual platform data 108 from performance simulator 102. Virtual platform data 108 may be provided automatically by performance simulator 102, may be provided by performance simulator 102 upon receiving a request from VPMON module 104, may be ported over from performance simulator 102 to VPMON module 104 manually due to user interaction with simulation system 100, etc. Upon receiving virtual platform data 108, SA module 106 may determine at least one virtualized component within virtual platform data 108. For example, virtualized components may be component models corresponding to CPU, GPU, memory, buses, interfaces, etc. within the virtual platform in performance simulator 102. SA module 106 may then proceed to formulate a platform power model 110 based on at least one component power model 112. For example, SA module 106 may select component power models 112 corresponding to at least the virtualized components determined to exist in virtual platform data 108. In one embodiment, other component power models 112 may be selected to account for real-world influences corresponding to the virtual platform, the environment, etc. SA module 106 may then employ platform power model 110 in generating power data 116. For example, SA module 106 may receive performance data 114 from performance simulator 102. Performance data 114 may be generated by performance simulator 102 during simulation of a virtual platform, and may be provided automatically to SA module 106, sampled by SA module 106, etc. SA module 106 may then input performance data 114 into platform power model 110 to generate power data 116. For example, performance data 114 may include utilization data for virtualized components during the simulation of the virtual platform, platform power model 110 may include component power models 112 corresponding to the virtualized components, and applying the utilization data to the corresponding component power models 112 may generate a variety of power data related to, for example, component/platform power usage, efficiency, etc.

Figure 2:
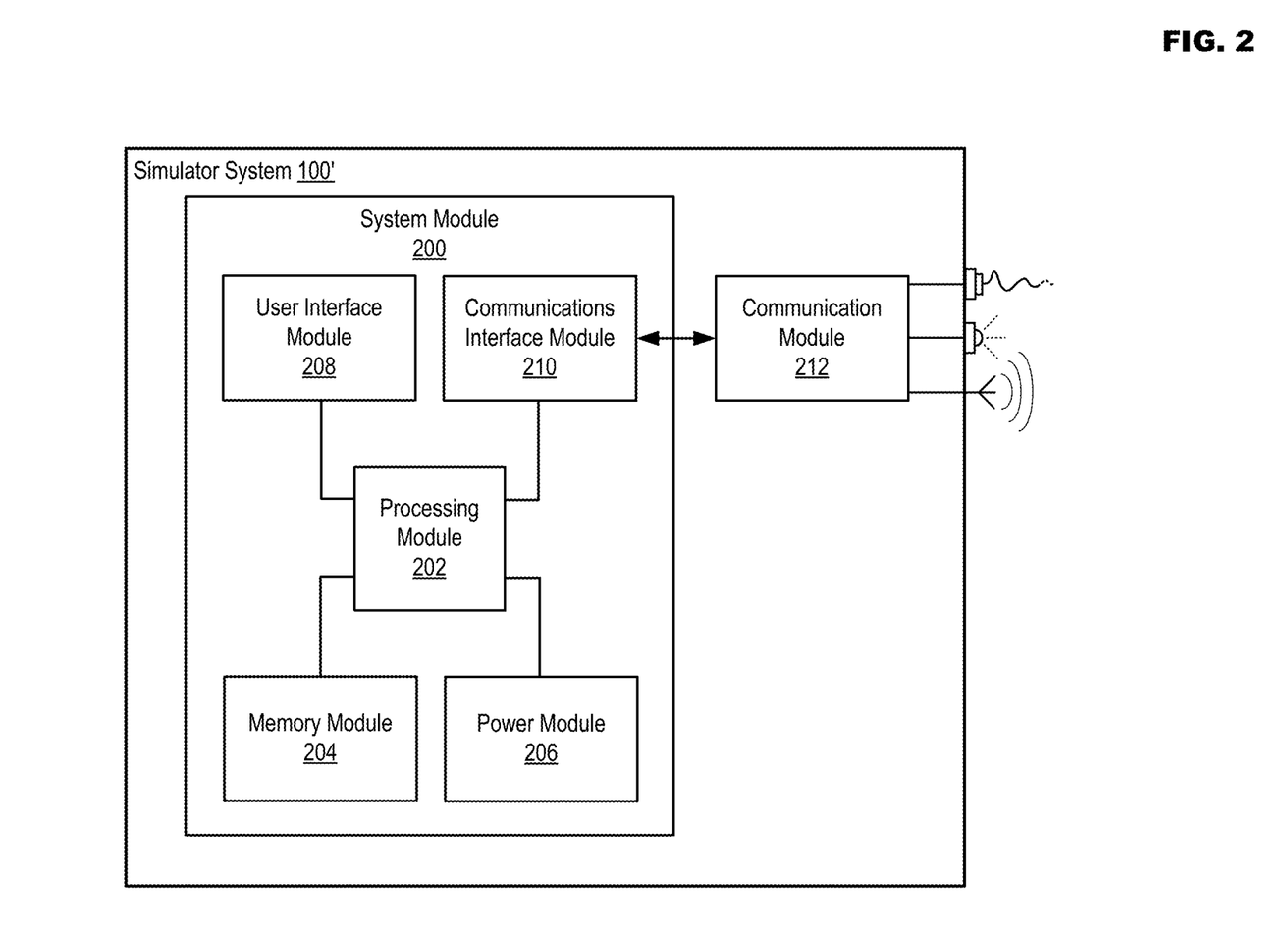
FIG. 2 illustrates an example configuration for a simulation system usable in accordance with at least one embodiment of the present disclosure.

FIG. 2 illustrates an example configuration for simulation system usable in accordance with at least one embodiment of the present disclosure. In particular, simulation system 100' may be capable of performing functionality such as disclosed in FIG. 1. However, simulation system 100' is meant only as an example apparatus usable in embodiments consistent with the present disclosure, and is not meant to limit these various embodiments to any particular manner of implementation. For example, simulation system 100' may comprise more than one device such as shown in FIG. 2, the devices operating separately or in unison via a network connection.

Simulation system 100' may comprise, for example, system module 200 configured to manage device operations. System module 200 may include, for example, processing module 202, memory module 204, power module 206, user interface module 208 and communication interface module 210. Simulation system 100' may also include communication module 212. While communication module 212 has been illustrated as separate from system module 200, the example implementation shown in FIG. 2 has been provided merely for the sake of explanation. Some or all of the functionality associated with communication module 212 may be incorporated in system module 200.

In simulation system 100', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in simulation system 100'. Some or all of the functionality commonly associated with the support circuitry may also be included in the same physical package as the processor (e.g., such as in the Sandy Bridge family of processors available from the Intel Corporation).

Processing module 202 may be configured to execute various instructions in simulation system 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include volatile memory configured to hold information during the operation of simulation system 100' such as, for example, static RAM (SRAM) or Dynamic RAM (DRAM). ROM may include non-volatile (NV) memory modules configured based on BIOS, UEFI, etc. to provide instructions when simulation system 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, fuel cell, etc.), and related circuitry configured to supply simulation system 100' with the power needed to operate. User interface module 208 may include hardware and/or software to allow users to interact with simulation system 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 208 may be incorporated within simulation system 100' and/or may be coupled to simulation system 100' via a wired or wireless communication medium.

Communication interface module 210 may be configured to manage packet routing and other control functions for communication module 212, which may include resources configured to support wired and/or wireless communications. In some instances, simulation system 100' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated within the same module.

In the example disclosed in FIG. 2, performance simulator 102 and VPMON module 104 may occupy and/or access various modules. In one embodiment, performance simulator 102 and VPMON module 104 may be comprised at least in part of software residing in memory module 204. Operations associated with performance simulator 102 and VPMON module 104 may be executed by processing module 202. Performance simulator 102 and VPMON module 104 may interact with users via user interface 208 and with other devices via communication module 212 (e.g., through communications interface module 210). Communication with other devices may occur in instances where, for example, simulator system 100' comprises more than one device.

Figure 3:
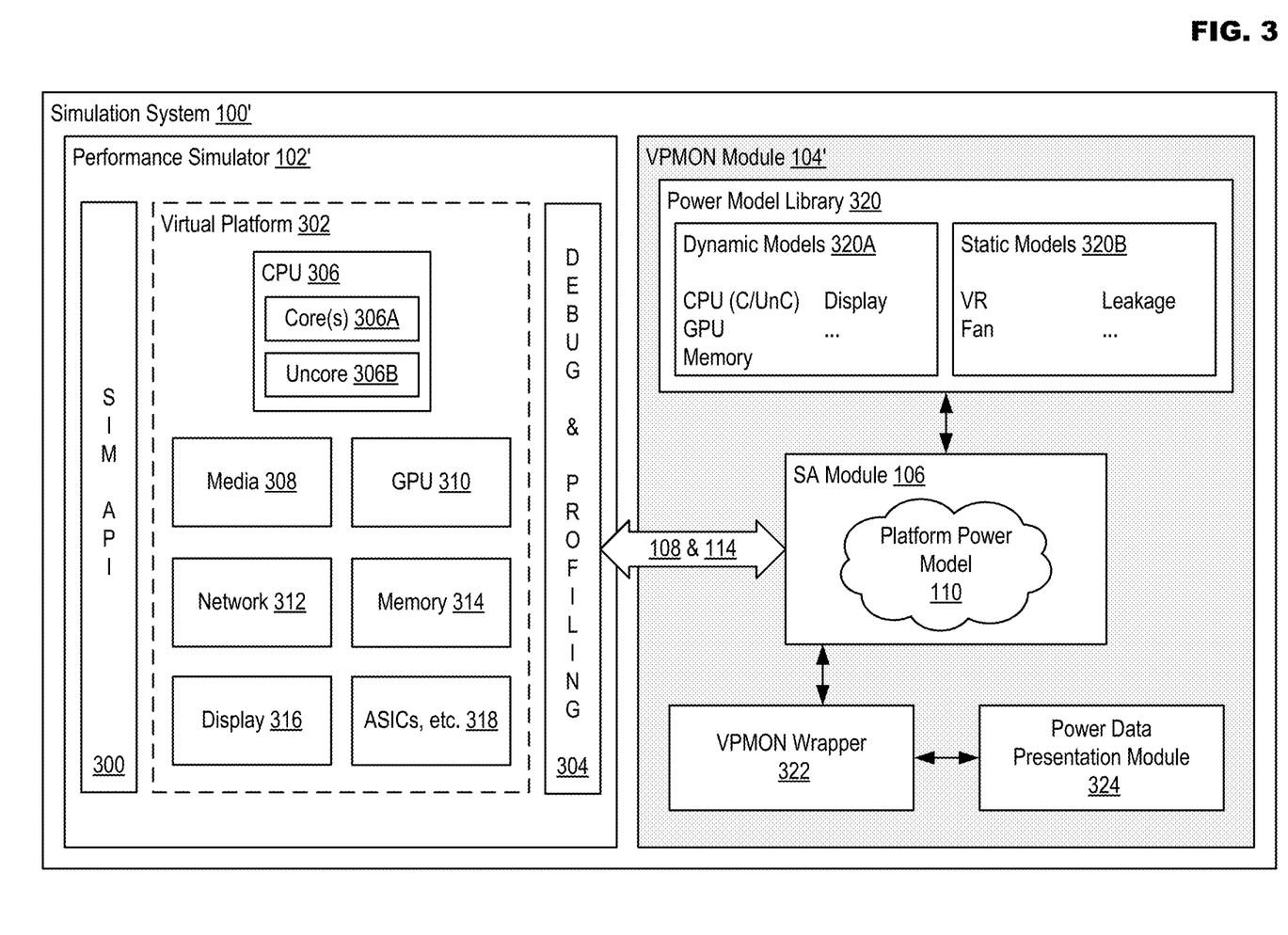
FIG. 3 illustrates an example functional layout of a power monitoring system for virtual platform simulation in accordance with at least one embodiment of the present disclosure.

FIG. 3 illustrates an example functional layout of a power monitoring system for virtual platform simulation in accordance with at least one embodiment of the present disclosure. In FIG. 3, simulation system 100' may comprise at least performance simulator 102' and VPMON module 104'. Example features identified within performance simulator 102' may be found in, for example, the Simics simulation system. Performance simulation 102' may comprise, for example, simulation application program interface (SIM API) 300, virtual platform 302 and debug and profiling 304. SIM API 300 may at least control the execution (e.g., simulation) of virtual platform 302. For example, SIM API 300 may cause virtual platform 302 to be loaded into performance simulator 102', may configure virtual platform 302 (e.g., may be cause certain virtualized components to be selected for virtual platform 302), may configure environmental factors for virtual platform 302, may cause the simulation for virtual platform 302 to start, pause, stop, etc., may affect other features within performance simulator 102' (e.g., the operation of debug and profiling 304), etc. Virtual platform 302 may comprise at least a software model of a hardware device, proposed hardware device, etc. Virtual platform 302 may comprise virtualized components corresponding to hardware components making up the hardware device. Examples of virtualized components disclosed in FIG. 3 may include, but are not limited to, CPU 306 that may comprise core(s) 306A and uncore 306B (e.g., all of the circuitry supporting CPU 306 that is not in core(s) 306A), media 308 (e.g., an intellectual property (IP) block for the processing of multimedia content such as textual data, audio data, video data, tactile data, etc.), GPU 310, network 312 (e.g., network interface card (NIC), wireless network modules, etc.), memory 314, display 316 (e.g., in a configuration incorporated within, or at least coupled to, virtual platform 302), application specific integrated circuits (ASICs) and any other previously uncategorized equipment 318. Debug and profiling 304 may interact with virtual platform 302 during configuration and/or runtime. Examples of interaction may include, but are not limited to, providing access to internal and/or external modules to configure, control and/or receive data from virtual platform 302. For example, debug and profiling 304 may at least provide access to VPMON module 104' to receive virtual platform data 108 and performance data 114 from performance simulator 102', and in at least one embodiment, may further provide some ability to control the simulation of virtual platform 302 (e.g., start/stop/pause of the simulation, etc.).

VPMON module 104' may comprise, for example, at least SA module 106, power model library 320, VPMON wrapper 322 and power data presentation module 324. SA module 106 may interact with performance simulator 102' at least in that virtual platform data 108 and performance data 114 may be obtained via debug and profiling 304. In an example of operation, SA module 106 may determine component power models 112 from power model library 320 based at least on virtual platform data 108. Power model library 320 may comprise at least one library of power models that may originate from, for example, the source (e.g., manufacturer) of VPMON module 104', from a manufacturer of hardware components (e.g., as new hardware components are made available for purchase corresponding power models are made available for download, from interaction with a user of simulation system 100' (e.g., manual configuration), etc. In the example disclosed in FIG. 3, power model library 320 comprises at least libraries of dynamic models 320A and static models 320B. Dynamic models 320A may include component power models 112 whose power data 116 may be variable based on the activity being simulated with virtual platform 302 and may comprise, for example, component power models 112 corresponding to CPU 306 including core(s) 306A and uncore 306B (e.g., C/UnC), GPU 310, memory 314, display 316, etc. Static models 320B may comprise component power models 112 wherein power data 116 may remain substantially stable regardless of the tasks being simulated for virtual platform 302 including, but not limited to, models for simulating power characteristics associated with voltage regulation (VR), fan(s) (e.g., CPU and/or system cooling fans), leakage, etc. SA module 106 may select component power models 112 from power model library 320 and may utilize the selected component power models 112 in formulating platform power model 110.

Continuing with the previous example of operation, SA module 106 may then at least receive performance data 114 from performance simulator 102' via debug and profiling 304. For example, during the simulation of virtual platform 302 SA module 106 may sample performance data 114 on a periodic basis, on an event-driven basis (e.g., based on the occurrence of an event during the simulation), on a manually-triggered basis (e.g., based on user interaction, etc.). In at least one embodiment, SA module 106 may be able to affect operation in performance simulator 102' via debug and profiling 304. For example, SA module 106 may be able to cause the simulation to pause during the sampling of performance data 114, and then to resume operation following completion of the sampling. SA module 106 may utilize performance data 114 to generate power data 116. In one embodiment, SA module 106 may input at least a portion of performance data 114 into platform power model 110. Power data 116 may then be generated at the component level (e.g., corresponding to individual component power models 112 in platform power model 110) or at the system level (e.g., corresponding to platform power model 110). The type of data within power data 116 may include, but is not limited to, power usage data, power conservation data, power efficiency data, device malfunction indications related to power issues, etc. Power data 116 may then be provided to a user of simulation system 100' for consumption. In an embodiment wherein VPMON module 104' may be at least in part software-based, VPMON wrapper 322 may encapsulate some or all of the functionality described with respect to VPMON module 104', and may provide power data 116 to power data presentation module 324. Power data presentation module 324 may be to convey power data 116 to performance simulator 102' (e.g., via debug and profiling 304) for presentation (e.g., display at least some of power data 116, display charts, graphs, etc. based on power data 116, generate visible or audible alerts based on power data 116, etc.), may include a separate user interface that may present power data 116 to a user of simulation system 100', may convey power data 116 to an external data consumer (e.g., applications such as databases, spreadsheets, graphical analysis programs, etc.), etc.

Figure 4:
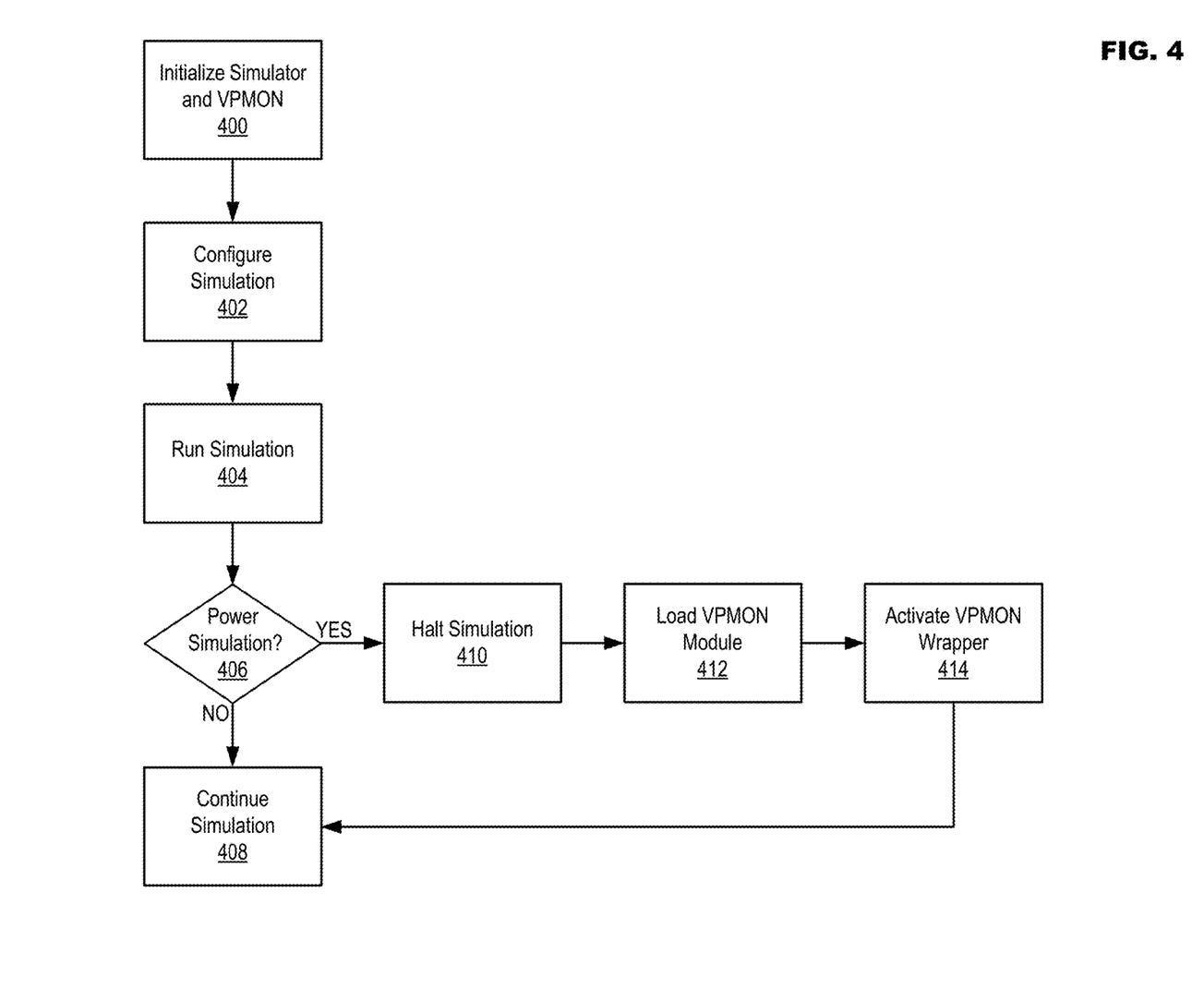
FIG. 4 illustrates example operations for virtual power monitor activation in accordance with at least one embodiment of the present disclosure.

FIG. 4 illustrates example operations for virtual power monitor activation in accordance with at least one embodiment of the present disclosure. In operation 400 performance simulator 102 and VPMON module 104 may be initialized. A performance simulation for virtual platform 302 may then be configured in operation 402. Configuration of the performance simulation may include, for example, virtualized components being added to, or removed from, virtual platform 302, operational and/or environmental conditions being set for virtual platform 302, certain tasks being specified for simulation, etc. The performance simulation may be initiated in operation 404. A determination may then be made in operation 406 as to whether power simulation should be initiated (e.g., whether the generation of power data 116 is desired based on the simulation of virtual platform 302). If in operation 406 it is determined that power simulation is not desired, then the performance simulation of virtual platform 302 may continue in operation 408.

If in operation 406 it is determined that power simulation is desired, then in operation 410 the performance simulation may be halted. VPMON module 104 may then be loaded (e.g., into the memory of simulation system 100) in operation 412. In operation 414 VPMON wrapper 322 may be activated. In one embodiment, the activation of VPMON wrapper 322 may activate functionality in VPMON module corresponding to at least one of receiving virtual platform data 108 from performance simulator 102, formulating platform power model 110, receiving performance data 114 from performance simulator 102 and using platform power model 110 to generate power data 116 based on performance data 114. Following the activation of VPMON wrapper 322 in operation 414 the simulation of virtual platform 302 may continue in operation 408.

Figure 5:
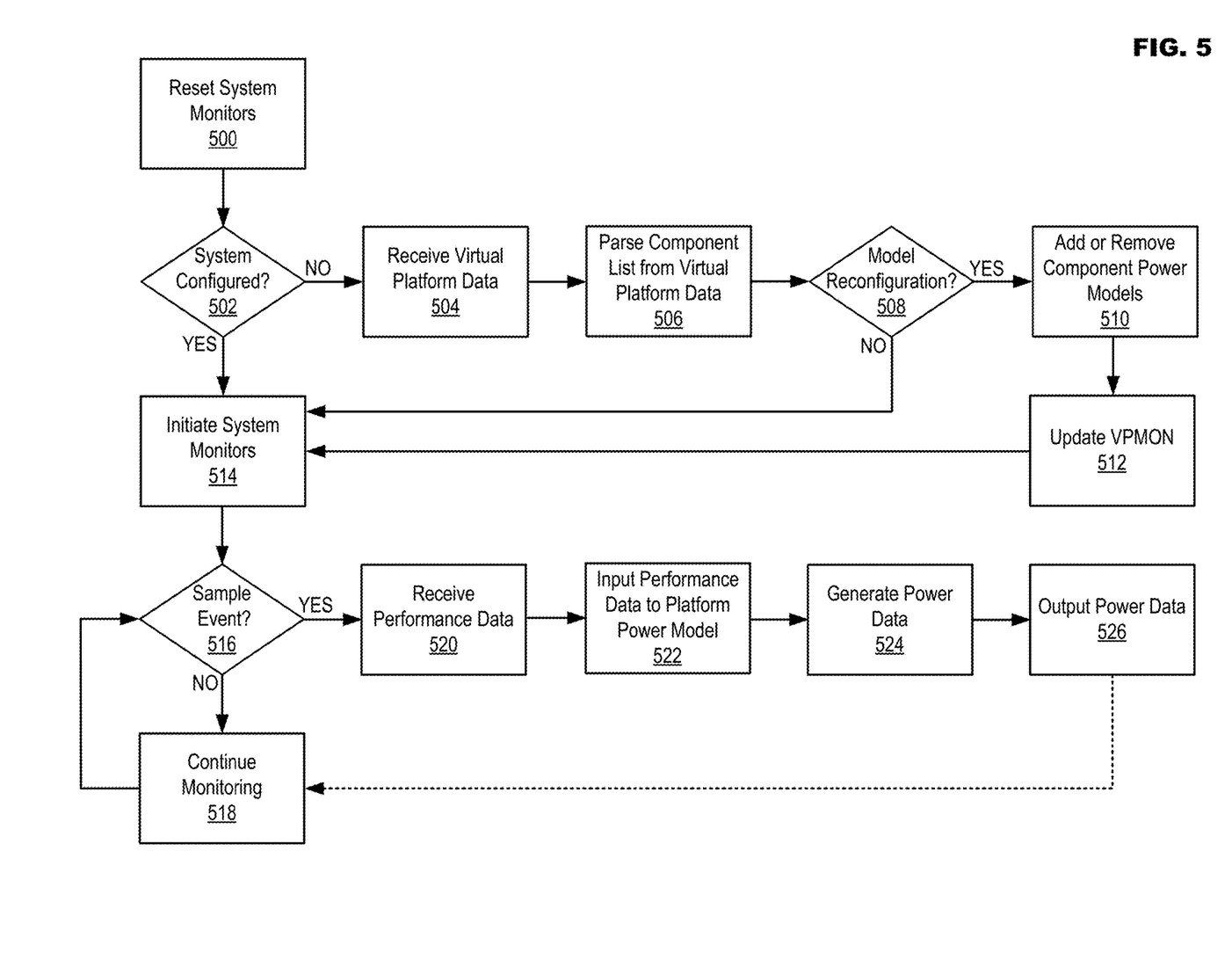
FIG. 5 illustrates example operations for virtual power monitor configuration in accordance with at least one embodiment of the present disclosure.

FIG. 5 illustrates example operations for virtual power monitor configuration in accordance with at least one embodiment of the present disclosure. The example operations disclosed in FIG. 5 may take place in, for example, VPMON module 104. In operation 500 system monitors (e.g., for receiving performance data 114) may be reset. A determination may then be made in operation 502 as to whether platform power model 110 has been configured based on the current configuration of performance simulator 102 (e.g., based on the particular virtual platform 302 loaded in performance simulator 102). If in operation 502 it is determined that the system is not configured, then virtual platform data 108 may be received in operation 504. In operation 506, virtual platform data 108 may be parsed (e.g., analyzed) to, for example, determine a list of virtualized components. A determination may then be made in operation 508 as to whether reconfiguration of platform model 110 is needed. In one embodiment, the parsed data from operation 506 may be compared to a list of component power models 112 currently in platform model 110 to determine if any differences exist. If in operation 508 it is determined that model reconfiguration is required, then in operation 510 component power models 112 may be added to, or removed from, power model 110. In one embodiment it may also be possible to configure new component power models 112 for virtualized components in virtual platform data 108 that do not have a corresponding component power model 112, to reconfigure an existing component power model 112 to more closely correspond to the real world characteristics of a virtualized component in virtual platform data 108, etc. In operation 512, VPMON module 104 may be updated based on any changes to platform power model 110 made in operation 410.

A determination in operation 502 that the system is configured or operation 512 may be followed by operation 514 wherein system monitors may be initiated in VPMON module 104. For example, a timer may be initiated that will be monitored for events that trigger sampling on a periodic basis, a detector may be initiated to monitor for non-timer related sample events, etc. A determination may then be made in operation 516 as to whether a sample event has occurred (e.g., that is time for periodic sampling, that a triggering event has been detected, etc.) If it is determined in operation 516 that no sample event has occurred, then monitoring may continue in operation 518. If in operation 516 it is determined that an event associated with sampling has occurred, then in operation 520 performance data 114 may be received in SA module 106. In operation 522, performance data 114 may be input into platform power model 110 to generate power data 116 in operation 524. The generation of power data 116 in operation 524 may then be followed by the output of power data 116 (e.g., for presentation) in operation 526. The output of power data 116 in operation 526 may optionally be followed by operation 518 wherein power monitoring may continue.

While FIGS. 4 and 5 illustrate operations according to different embodiments, it is to be understood that not all of the operations depicted in FIGS. 4 and 5 are necessary for other embodiments. Indeed, it is fully contemplated herein that in other embodiments of the present disclosure, the operations depicted in FIGS. 4 and 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this application is directed to a power monitoring system for virtual platform simulation. In one embodiment, a simulation system may comprise a virtual power monitor (VPMON) and a performance simulator. An example VPMON module may include at least a system agent (SA) module to receive virtual platform data from the performance simulator. The SA module may then be further to determine at least one component power model based on the virtual platform data, and may proceed to formulate a platform power model based on the at least one component power model. During simulation of the virtual platform, the SA module may be further to generate power data corresponding to the virtual platform based on the platform power model. For example, the SA module may obtain performance data from the performance simulator, and may provide the performance data to the platform power model to generate the power data.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a power monitoring system for virtual platform simulation, as provided below.

According to example 1 there is provided a simulation system. The simulation system may comprise a virtual power monitor module to interact with a performance simulator, the virtual power monitor module comprising at least a system agent module to receive at least virtual platform data from the performance simulator, determine at least one component power model based on the virtual platform data, formulate a platform power model based on the at least one component power model and generate power data corresponding to the virtual platform based on the platform power model.

Example 2 may comprise the elements of example 1, wherein the system agent module being to determine at least one component power model comprises the system agent module being to select at least one component power model to correspond to at least one virtualized component in the virtual platform data.

Example 3 may comprise the elements of example 2, wherein the virtual power monitor module further comprises a power model library, the system agent module being to select the at least one component power model from the power model library.

Example 4 may comprise the elements of example 3, wherein the power model library comprises at least one of dynamic component power models and static component power models.

Example 5 may comprise the elements of example 4, wherein the power data associated with the dynamic component power models is variable during simulation of a virtual platform by the performance simulator.

Example 6 may comprise the elements of any of examples 4 to 5, wherein the power data associated with the static component power models is substantially constant during simulation of a virtual platform by the performance simulator.

Example 7 may comprise the elements of example 3, wherein the virtual power monitor module further comprises a power data presentation module to facilitate presentation of the power characteristics and a programmatic wrapper to encapsulate at least the system agent module, power model library and power data presentation module.

Example 8 may comprise the elements of example 7, wherein the power data presentation module is to at least present the power data to a user.

Example 9 may comprise the elements of any of examples 7 to 8, wherein the power data presentation module is to at least provide the power data to the performance simulator for presentation.

Example 10 may comprise the elements of any of examples 7 to 8, wherein the power data presentation module is to at least provide the power data to an application in the simulation system not associated with the performance simulator or the virtual power monitor module.

Example 11 may comprise the elements of any of examples 7 to 8, wherein virtual power monitor module is comprised of a software component extension that plugs into the performance simulator.

Example 12 may comprise the elements of any of examples 2 to 4, wherein the virtual power monitor module further comprises a power model library including at least one of dynamic component power models and static component power models, the system agent module being to select the at least one component power model from the power model library.

Example 13 may comprise the elements of any examples 1 to 4, wherein the performance simulator comprises a debug and profiling interface to interact with the system agent module.

Example 14 may comprise the elements of example 13, wherein the performance simulator further comprises a simulation application program interface to at least control simulation of a virtual platform.

Example 15 may comprise the elements of any of examples 1 to 4, wherein the system agent module being to formulate a platform power model comprises the system agent module being to facilitate inserting component power models into, or removing component power models from, the platform power model.

Example 16 may comprise the elements of any of examples 1 to 4, wherein the system agent module being to generate power characteristics comprises the system agent module being to receive at least performance data from the performance simulator and utilize the platform power model to generate the power data based on the performance data.

Example 17 may comprise the elements of example 16, wherein the system agent being to receive at least performance data comprises the system agent being to sample the performance data periodically.

Example 18 may comprise the elements of example 16, wherein the system agent being to receive at least performance data comprises the system agent being to sample the performance data upon the occurrence of an event.

According to example 19 there is provided a method for monitoring power in a simulation system. The method may comprise receiving at least virtual platform data in a virtual power monitor module from a performance simulator, determining at least one component power model based on the virtual platform data, formulating a platform power model based on the at least one component power model and generating power data corresponding to the virtual platform based on the platform power model.

Example 20 may comprise the elements of example 19, wherein determining at least one component power model comprises selecting at least one component power model to correspond to at least one virtualized component in the virtual platform data.

Example 21 may comprise the elements of example 20, wherein the at least one component power model is selected from a power model library in the virtual power monitor module.

Example 22 may comprise the elements of example 21, wherein the power model library comprises at least one of dynamic component power models and static component power models.

Example 23 may comprise the elements of example 22, wherein the power data associated with the dynamic component power models is variable during simulation of a virtual platform by the performance simulator.

Example 24 may comprise the elements of any of examples 22 to 23, wherein the power data associated with the static component power models is substantially constant during simulation of a virtual platform by the performance simulator.

Example 25 may comprise the elements of any of examples 20 to 23, wherein the at least one component power model is selected from a power model library in the virtual power monitor module, the power model library including at least one of dynamic component power models and static component power models.

Example 26 may comprise the elements of any of examples 19 to 23, wherein formulating a platform power model comprises facilitating inserting component power models into, or removing component power models from, the platform power model.

Example 27 may comprise the elements of any of examples 19 to 23, wherein generating power characteristics comprises receiving at least performance data in the virtual power monitor module from the performance simulator and utilizing the platform power model to generate the power data based on the performance data.

Example 28 may comprise the elements of example 27, wherein receiving at least performance data comprises sampling the performance data periodically.

Example 29 may comprise the elements of example 27, wherein receiving at least performance data comprises sampling the performance data upon the occurrence of an event.

According to example 30 there is provided a system including at least a device, the system being arranged to perform the method of any of the above examples 19 to 29.

According to example 31 there is provided a chipset arranged to perform the method of any of the above examples 19 to 29.

According to example 32 there is provided at least one machine readable medium comprising a plurality of instructions that, in response to be being executed on a computing device, cause the computing device to carry out the method according to any of the above examples 19 to 29.

According to example 33 there is provided at least one device configured for use with a power monitoring system for virtual platform simulation, the device being arranged to perform the method of any of the above examples 19 to 29.

According to example 34 there is provided a system for monitoring power in a simulation system, comprising means for receiving at least virtual platform data in a virtual power monitor module from a performance simulator, means for determining at least one component power model based on the virtual platform data, means for formulating a platform power model based on the at least one component power model and means for generating power data corresponding to the virtual platform based on the platform power model.

Example 35 may comprise the elements of example 34, wherein the means for determining at least one component power model comprise means for selecting at least one component power model to correspond to at least one virtualized component in the virtual platform data.

Example 36 may comprise the elements of example 35, wherein the at least one component power model is selected from a power model library in the virtual power monitor module.

Example 37 may comprise the elements of example 36, wherein the power model library comprises at least one of dynamic component power models and static component power models.

Example 38 may comprise the elements of any of examples 34 to 37, wherein the means for formulating a platform power model comprise means for facilitating inserting component power models into, or removing component power models from, the platform power model.

Example 39 may comprise the elements of any of examples 34 to 37, wherein the means for generating power characteristics comprise means for receiving at least performance data in the virtual power monitor module from the performance simulator and means for utilizing the platform power model to generate the power data based on the performance data.

Example 40 may comprise the elements of example 39, wherein the means for receiving at least performance data comprise means for sampling the performance data periodically.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
    processor simulation circuitry to execute a virtual platform to simulate hardware device performance in a system;
    instructions; and
    system agent circuitry to execute the instructions to:
        identify each of a plurality of simulated hardware components included in the system to be simulated in a platform power model using the processor simulation circuitry;
        identify differences between a list of component power models in the platform power model and the plurality of simulated hardware components included in the system;
        in response to determining there are differences, retrieve, from one or more power model libraries, a plurality of component power models, each of the plurality of component power models corresponding to respective ones of at least some of the identified plurality of simulated hardware components;
        generate at least one reconfigured platform power model by combining the retrieved plurality of component power models, the reconfigured platform power model to simulate power consumption of the system that includes the plurality of simulated hardware components;

cause the processor simulation circuitry to pause operation in response to at least one of a periodic sampling interval or an event-driven sampling interval, wherein in response to pausing the operation of the processor simulation circuitry, receive performance data from the processor simulation circuitry, the performance data generated from a simulation of the hardware components included in the system during the operation of the processor simulation circuitry;

cause the processor simulation circuitry to resume operation; and generate power data associated with the system by inputting at least a portion of the received performance data into the reconfigured platform power model, the power data separate from the received performance data.

2. The apparatus of claim 1, wherein the plurality of simulated hardware components include virtualized memory corresponding to memory of the system.

3. The apparatus of claim 1, wherein the one or more power model libraries include at least one of dynamic component power models or static component power models.

4. The apparatus of claim 3, wherein the dynamic component power models represent dynamic power data corresponding to at least one simulated task.

5. The apparatus of claim 1, wherein the plurality of component power models correspond to simulation of at least one of CPU activity, GPU activity, display activity, or memory activity.

6. The apparatus of claim 1, wherein, in response to determining there are differences, remove one or more component power models from the platform power model based on the identified plurality of simulated hardware components included in the system.

7. A first system, comprising:
performance simulation circuitry to execute a virtual platform to simulate hardware device performance in a second system; and
virtual power monitor circuitry to interact with the performance simulation circuitry, the virtual power monitor circuitry including at least system agent circuitry to:
identify each of a plurality of simulated hardware components included in the second system to be simulated in a platform power model using the processor simulation circuitry;
identify differences between a list of component power models in the platform power model and the plurality of simulated hardware components included in the second system;
in response to determining there are differences, retrieve, from one or more power model libraries, a plurality of component power models, each of the plurality of component power models corresponding to respective ones of at least some of the identified plurality of simulated hardware components;
generate at least one reconfigured platform power model by combining the retrieved plurality of component power models, the reconfigured platform power model to simulate power consumption of the second system that includes the plurality of simulated hardware components;

cause the processor simulation circuitry to pause operation in response to at least one of a periodic sampling interval or an event-driven sampling interval;
in response to pausing the operation of the processor simulation circuitry, receive performance data from the processor simulation circuitry, the performance data generated from a simulation of the hardware components included in the system during the operation of the processor simulation circuitry;
cause the processor simulation circuitry to resume operation; and
generate power data associated with the second system by inputting at least a portion of the received performance data into the reconfigured platform power model, the power data separate from the received performance data.

8. The first system of claim 7, wherein the plurality of simulated hardware components include virtualized memory corresponding to memory of the second system.

9. The first system of claim 7, wherein the one or more power model libraries include at least one of dynamic component power models or static component power models.

10. The first system of claim 9, wherein the dynamic component power models represent dynamic power data corresponding to at least one simulated task.

11. The first system of claim 7, wherein the plurality of component power models correspond to simulation of at least one of CPU activity, GPU activity, display activity, or memory activity.

12. The first system of claim 7, wherein, in response to determining there are differences, remove one or more component power models from the platform power model based on the identified plurality of simulated hardware components included in the system.

13. A method for monitoring power, the method comprising:
identifying, by system agent circuitry communicatively coupled to processor simulation circuitry, each of a plurality of simulated hardware components included in a system to be simulated in a platform power model using the processor simulation circuitry;
identifying differences between a list of component power models in the platform power model and the plurality of simulated hardware components;
in response to determining there are differences, retrieving from one or more power model libraries, by the system agent circuitry, a plurality of component power models, each of the plurality of component power models corresponding to respective ones of some of the identified plurality of simulated hardware components included in the system;
generating, by the system agent circuitry, at least one reconfigured platform power model by combining the retrieved plurality of component power models, the reconfigured platform power model to simulate power consumption of the system that includes the plurality of simulated hardware components;
causing the processor simulation circuitry to pause operation in response to at least one of a periodic sampling interval or an event-driven sampling interval;
in response to pausing the operation of the processor simulation circuitry, receiving, by the system agent circuitry, performance data from the processor simulation circuitry, the performance data generated from a simulation of the hardware components included in the system during the operation of the processor simulation circuitry;

causing the processor simulation circuitry to resume operation; and generating, by the system agent circuitry, power data associated with the system by inputting at least a portion of the received performance data into the reconfigured platform power model, the power data separate from the received performance data.

14. The method of claim 13, wherein the plurality of simulated hardware components include virtualized memory corresponding to memory of the system.

15. The method of claim 13, wherein the one or more power model libraries include at least one of dynamic component power models or static component power models.

16. The method of claim 15, wherein the dynamic component power models represent dynamic power data corresponding to at least one simulated task.

17. The method of claim 13, wherein the plurality of component power models correspond to simulation of at least one of CPU activity, GPU activity, display activity, or memory activity.

18. The method of claim 13, wherein, in response to determining there are differences, removing one or more component power models from the platform power model based on the identified plurality of simulated hardware components included in the system.

* * * * *